United States Patent
Efrati et al.

(10) Patent No.: US 9,210,198 B2
(45) Date of Patent: Dec. 8, 2015

(54) METHOD AND APPARATUS FOR TRANSFERRING ACTIVE COMMUNICATION SESSION STREAMS BETWEEN DEVICES

(71) Applicant: VONAGE NETWORK LLC, Holmdel, NJ (US)

(72) Inventors: Tzahi Efrati, Hoboken, NJ (US); Arthur Wilton, East Windsor, NJ (US)

(73) Assignee: Vonage Networks LLC, Holmdel, NJ (US)

( * ) Notice: Subject to any disclaimer, the term of this patent is extended or adjusted under 35 U.S.C. 154(b) by 393 days.

(21) Appl. No.: 13/906,984

(22) Filed: May 31, 2013

(65) Prior Publication Data

US 2014/0359139 A1    Dec. 4, 2014

(51) Int. Cl.
| | |
|---|---|
| H04L 29/06 | (2006.01) |
| H04M 3/58 | (2006.01) |
| H04M 3/56 | (2006.01) |
| H04M 7/00 | (2006.01) |

(52) U.S. Cl.
CPC .......... *H04L 65/1069* (2013.01); *H04L 65/403* (2013.01); *H04L 65/4007* (2013.01); *H04M 3/567* (2013.01); *H04M 3/58* (2013.01); *H04M 7/0039* (2013.01); *H04M 2201/50* (2013.01); *H04M 2203/2094* (2013.01); *H04M 2250/02* (2013.01); *H04M 2250/04* (2013.01)

(58) Field of Classification Search
CPC ............. H04L 65/4007; H04L 65/403; H04M 7/0039; H04M 3/567; H04M 3/58; H04M 2203/2094; H04M 2201/50; H04M 2250/02
See application file for complete search history.

(56) References Cited

U.S. PATENT DOCUMENTS

| | | |
|---|---|---|
| 2005/0250534 A1 | 11/2005 | Maurer |
| 2006/0193448 A1 | 8/2006 | Donoghue et al. |
| 2011/0219419 A1* | 9/2011 | Reisman ........... G06F 17/30873 725/112 |
| 2011/0222466 A1 | 9/2011 | Pance et al. |
| 2011/0271210 A1* | 11/2011 | Jones .................. H04L 12/1827 715/753 |

(Continued)

FOREIGN PATENT DOCUMENTS

| | | |
|---|---|---|
| EP | 2 007 101 A1 | 12/2008 |
| EP | 2552110 A1 | 1/2013 |
| WO | 2012089830 A1 | 7/2012 |

OTHER PUBLICATIONS

International Search Report and Written Opinion mailed Sep. 24, 2014 for Application PCT/US201/040127.

*Primary Examiner* — Le H Luu
(74) *Attorney, Agent, or Firm* — Moser Taboada; Joseph Pagnotta

(57) ABSTRACT

Methods and system for routing first communication session data between a first device and at least one participant device via a first communication session are provided herein. In some embodiments, a method for routing first communication session data between a first device and at least one participant device includes receiving a request to establish a second communication session with at least one discovered extension device proximate to the first device, routing at least a portion of the communication session data to the discovered extension device via the second communication session and synchronizing the communication session data routed via the first communication session, and the at least a portion of the communication session data routed via the second communication session.

21 Claims, 7 Drawing Sheets

(56) References Cited

U.S. PATENT DOCUMENTS

| | | | |
|---|---|---|---|
| 2012/0084834 A1* | 4/2012 | Brown | H04W 4/021 726/3 |
| 2012/0144007 A1 | 6/2012 | Choong | |
| 2012/0236110 A1 | 9/2012 | Ogle et al. | |
| 2012/0254031 A1 | 10/2012 | Walker et al. | |
| 2013/0014136 A1* | 1/2013 | Bhatia | H04N 21/252 725/9 |
| 2013/0076980 A1 | 3/2013 | Oren et al. | |
| 2013/0132854 A1* | 5/2013 | Raleigh | G06F 3/0482 715/738 |
| 2013/0138619 A1* | 5/2013 | Krislov | G06F 17/3061 707/695 |
| 2013/0145016 A1* | 6/2013 | Vantalon | H04N 21/2541 709/224 |
| 2013/0268767 A1* | 10/2013 | Schrecker | G06F 21/31 713/185 |
| 2014/0129570 A1* | 5/2014 | Johnson | H04N 21/4126 707/748 |
| 2014/0223099 A1* | 8/2014 | Kidron | G06F 12/0806 711/118 |
| 2014/0287685 A1* | 9/2014 | Griffin | H04W 12/02 455/41.2 |

* cited by examiner

METHOD AND APPARATUS FOR TRANSFERRING ACTIVE COMMUNICATION SESSION STREAMS BETWEEN DEVICES

BACKGROUND OF THE INVENTION

1. Field of the Invention

Embodiments consistent with the present invention generally relate to methods, apparatus, and systems for transferring active communication session streams between devices.

2. Description of the Related Art

Conventionally, an Internet Protocol (IP) telephony system receives a call setup request from the calling party's telephony device at an inbound proxy server (or a session border controller, or an originating gateway). The inbound proxy server consults a routing engine to determine the identity of an outbound proxy server (or session border controller or destination gateway) that is capable of communicating with the called telephony device. The inbound proxy server passes along the call setup request to the outbound proxy server. The outbound proxy server then contacts the called telephony device to attempt to setup the call.

For teleconferencing or video conferences, media data (e.g. streaming video and audio data) may be transmitted between telephony and other electronic communication devices. In telecommunications, a data stream is a sequence of digitally encoded coherent signals (packets of data or data packets) used to transmit or receive information that is in the process of being transmitted. During the call setup, the calling telephony device and the called telephony device are instructed where to send data packets bearing the media of the telephony communication such that data packets can be delivered to the other telephony device. Often, the calling and called telephony devices are instructed to send data packets to the media relay, and to receive data packets from that media relay. In some instances, two or more media relays may be used in a chain fashion to create a path for the data packets to travel between the calling and called telephony devices.

Typically, participants of teleconferences may have access to multiple electronic devices that are capable of streaming data. However, conventional systems are configured such that teleconferencing for users is combined into a single stream for a single telephony device, such as a smart phone. For high definition conferences or instances where large amounts of streaming data are transmitted, participants are limited to using a single device and display. The limited view provided by a single electronic device restricts the user from experiencing a realistic meeting environment.

Accordingly, there is a need for a method and system for improving the transfer of active communication session streams between devices.

SUMMARY OF THE INVENTION

Methods and system for routing first communication session data between a first device and at least one participant device via a first communication session are provided herein. In some embodiments, a method for routing first communication session data between a first device and at least one participant device includes receiving a request to establish a second communication session with at least one discovered extension device proximate to the first device, routing at least a portion of the communication session data to the discovered extension device via the second communication session and synchronizing the communication session data routed via the first communication session, and the at least a portion of the communication session data routed via the second communication session.

In some embodiments, a method for transferring active communication session data includes transferring communication session data between a first device and at least one participant device via a first communication session, discovering a presence of at least one extension device proximate the first device, sending a request to have at least a portion of the communication session data routed to one of the at least one discovered extension device via a second communication session, and synchronizing the communication session data routed via the first communication session, and the at least a portion of the communication session data routed via the second communication session.

In some embodiments, a system for routing active communication session data may include at least one processor, at least one input device coupled to at least one network, and at least one storage device storing processor executable instructions, which, when executed by the at least one processor, performs a method including routing first communication session data between a first device and at least one participant device via a first communication session, receiving a request to establish a second communication session with at least one discovered extension device proximate the first device, routing at least a portion of the communication session data to the discovered extension device via the second communication session. Synchronizing the communication session data routed via the first communication session, and the at least a portion of the communication session data routed via the second communication session.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention are directed to methods, and systems for extending the transfer of active communication session streams between devices. Specifically, using a proximity heuristic, user preference, or direct user action, media streams (e.g., audio and video), or portions thereof, may be transferred between devices.

Figure 1:
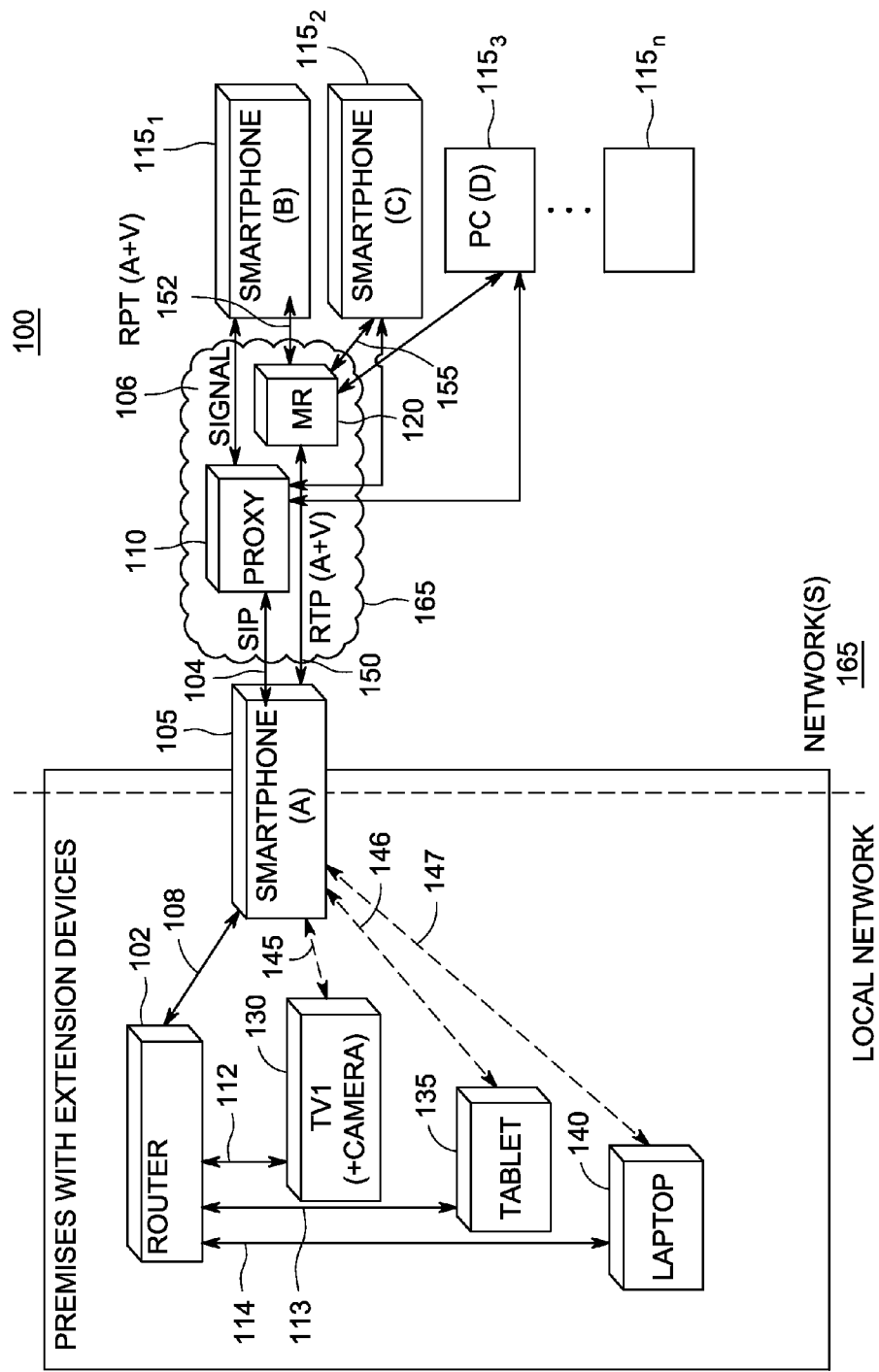
FIG. 1 is a simplified illustration of a communications system including a first electronic device and at least one second electronic device in accordance with one or more exemplary embodiments of the invention.

FIG. 1 is a simplified illustration of a communications system 100 including a first electronic device 105 and at least one second electronic device 115 in accordance with one or more exemplary embodiments of the invention. The system 100 establishes and maintains a conference session wherein multiple electronic devices are in a single shared simultaneous communication session for example, an audio and/or video communication session. In some embodiments, the first electronic device 105 has access to a local network 160 (e.g., local area network, wireless local area network, and the like) as well as another network(s) 165 to communicatively couple to one or more participant devices ($115_1$, $115_2$, $115_3$ ... $115_n$). The networks 165 may be, for example, one or more interconnected networks such as an Internet Protocol (IP) network, a public switched telephone network (PSTN), or a mobile telephony service provider network. In some embodiments, the first electronic device 105 may be a Voice over Internet Protocol (VoIP) device, such as a smartphone, and may use a Session Initiation Protocol (SIP) for establishing a telecommunication session with another device such as second electronic devices 115n. The details and functionality of SIP can be found for example, in the Internet Engineering Task Force (IETF) Request for Comments Paper No. 3261. Although in some embodiments, the first electronic device 105 and the participant devices ($115_1$, $115_2$, $115_3$ ... $115_n$) may be smartphones as described below, in other embodiments the first electronic device 105 and participant devices ($115_1$, $115_2$, $115_3$ ... $115_n$) may be any electronic device capable of establishing or otherwise facilitating a communication session with another device.

In some embodiments, the network(s) 165 may include proxy server(s) 110 and a media relay(s) 120 for facilitating audio/video communication sessions between the first electronic device 105 and one or more of the participant devices ($115_1$, $115_2$, $115_3$, ... $115_n$).

In exemplary embodiments, the local network 160 may comprise a local network router 102, a first extension device 130, a second extension device 135, and a third extension device 140. The three extension devices (130, 135, 140) are illustrative of an exemplary embodiment such that further embodiments may include a varied number of extension devices. The first electronic device 105, participant devices ($115_1$, $115_2$, $115_3$, ... $115_n$), and extension devices (130, 135, 140) may be any user terminal capable of IP telephony (e.g. smartphones, laptops, tablets, desktops, and the like).

In some exemplary embodiments, during a communication session (e.g. conference call) the first electronic device 105 initiates a call setup to the second electronic device 115 through the proxy server via SIP signals (arrow 104). Similarly, the second electronic device sends signals represented by arrow 106, that may be SIP or through other signaling protocols to maintain a communication channel with proxy server 110 such as Extensible Messaging and Presence Protocol (XMPP), H.323 and the like.

In alternative embodiments, additional participant devices $115_n$ may be conferenced into the communication session. Once the communication session has been setup, the called and calling telephony devices (e.g. devices 105 and $115_n$) exchange data packets to each other using the path established during call setup. The devices also negotiate what media will be communicated and corresponding parameters. In some embodiments, the parameters may include data for streaming video and audio such as codec information, bandwidth, and the like. The established path includes one or more media relays (e.g., 120) that are used to help transmit the data packets between the electronic devices (105, $115_n$) in the communication session. The data packets for the communication session may include streaming audio and video transmitted using the real-time transport protocol (RTP) represented as arrow 150. The details and functionality of RTP can be found for example, in the Internet Engineering Task Force (IETF) Request for Comments Paper No. 3550. The single stream (arrow 150) is comprised of additional streams (e.g. arrows 152 and 155) that may be transmitted between the media relay 120 and participant devices $115_n$.

In some embodiments, the media relay 120 and proxy server 110 may establish communication to alert the media relay 120 when an incoming stream is legitimate from an authorized source. Similarly, as will be discussed below, the proxy server 110 may communicate with the media relay 120 as to which extension device (130, 135, 140) to route the audio and/or video media stream.

After the communication session is established, the media relay 120 transmits audio and video originating from the participant devices $115_n$ as the single stream (arrow 150) to the first electronic device 105. The single stream (arrow 150) is a multiplexed data stream of real-time data comprising audio and/or video to and from the media relay 120 that processes data streams to and from the participant devices $115_n$. Once the first electronic device 105 is within range of a network access point such as the router 102, the first electronic device 105 requests authentication into the same network as the router 102 using a wireless connection channel 108. Following authentication, the first electronic device 105 discovers the capabilities of extension devices (130, 135, 140) using network discovery protocols and signaling conventions. For example, one such protocol may be universal plug and play (UPNP). In embodiments where extension devices (130, 135, 140) are not pre-authenticated onto the local network 160, the extension devices (130, 135, 140) may be manually or automatically authenticated onto the local network 160.

In some embodiments, the first electronic device 105 may be directly connected (arrows 145, 146, 147) to discover capabilities by pairing with the extension devices (130, 135, 140) through Bluetooth, near-field communications (NFC), Wi-Fi or other communication protocol. In such embodiments, wherein the first electronic device 105 is directly coupled to extension devices (130, 135, 140) via a personal area network such as Bluetooth, the first electronic device 105 may operate as a gateway. In these embodiments, single data stream (arrow 150) from the media relay 120 may be parsed, demutliplexed, or even duplicated into multiple streams (e.g. "sub-streams") by the first electronic device 105. The multiple data streams may then be each routed to respective extension devices (130, 135, 140) via a communication protocol (e.g., Bluetooth, Wi-Fi, and the like). Similarly, the outbound streams from respective extension devices (e.g., via camera and/or microphone) may be communicated via the first electronic device 105 to the media relay server 120.

In other embodiments, discovery of extension devices (130, 135, 140) is achieved through the network router 102 using either wired and/or wireless network connections (arrows 112, 113, and 114). In such embodiments, discovered capabilities may include whether the extension device is capable of recognizing and process real-time communications streams. Discovered capabilities thus includes output of outbound audio and video communication streams and input of real-time outbound communication audio and video streams (e.g. recording via camera and/or microphone).

FIG. 1 depicts an embodiment wherein the first electronic device 105 is capable of requesting and maintaining connection to a local network 160 and network 165. The first electronic device 105 is capable of processing data packets (e.g. video and audio streams) across the networks. In some embodiments, the network 165 may be a cellular network or wide-area network and the local network may be a Wi-Fi or wireless network. Each network type has specific advantages. For example, the local network 160 allows for more transmission bandwidth for conferencing data through the router 102 while the network 165 provides greater connection stability over a larger coverage area while the first electronic device is mobile. However, alternative embodiments may include transitions within the same wireless network or between two wireless area networks. In such embodiments, the media relay may be located within the network router 102.

Once capabilities are discovered for the extension devices (130, 135, 140), the first electronic device 105 is capable of redirecting streams of the communication session to extension devices recognized as capable of handling streaming data. The user of the first electronic device 105 may be presented with options to select which extension device is to receive a specified stream.

As will be discussed further with respect to FIG. 2, streams may include both audio and video streams from each conference participant device $115_n$ or duplication of only a portion of the entire conference. The portion may be a parsed stream from the stream (arrow 150) from the media relay 120. For example, the first extension device 130 may stream audio and video from the second electronic device $115_1$ and the second extension device 135 may stream audio and video from another participant device $115_3$. Alternatively, the first extension device 130 may be a projection screen streaming only inbound video and the second extension device 135 may be a tablet to stream video and audio. Further embodiments on stream splitting vary based on the detected capabilities of each extension device.

Figure 2:
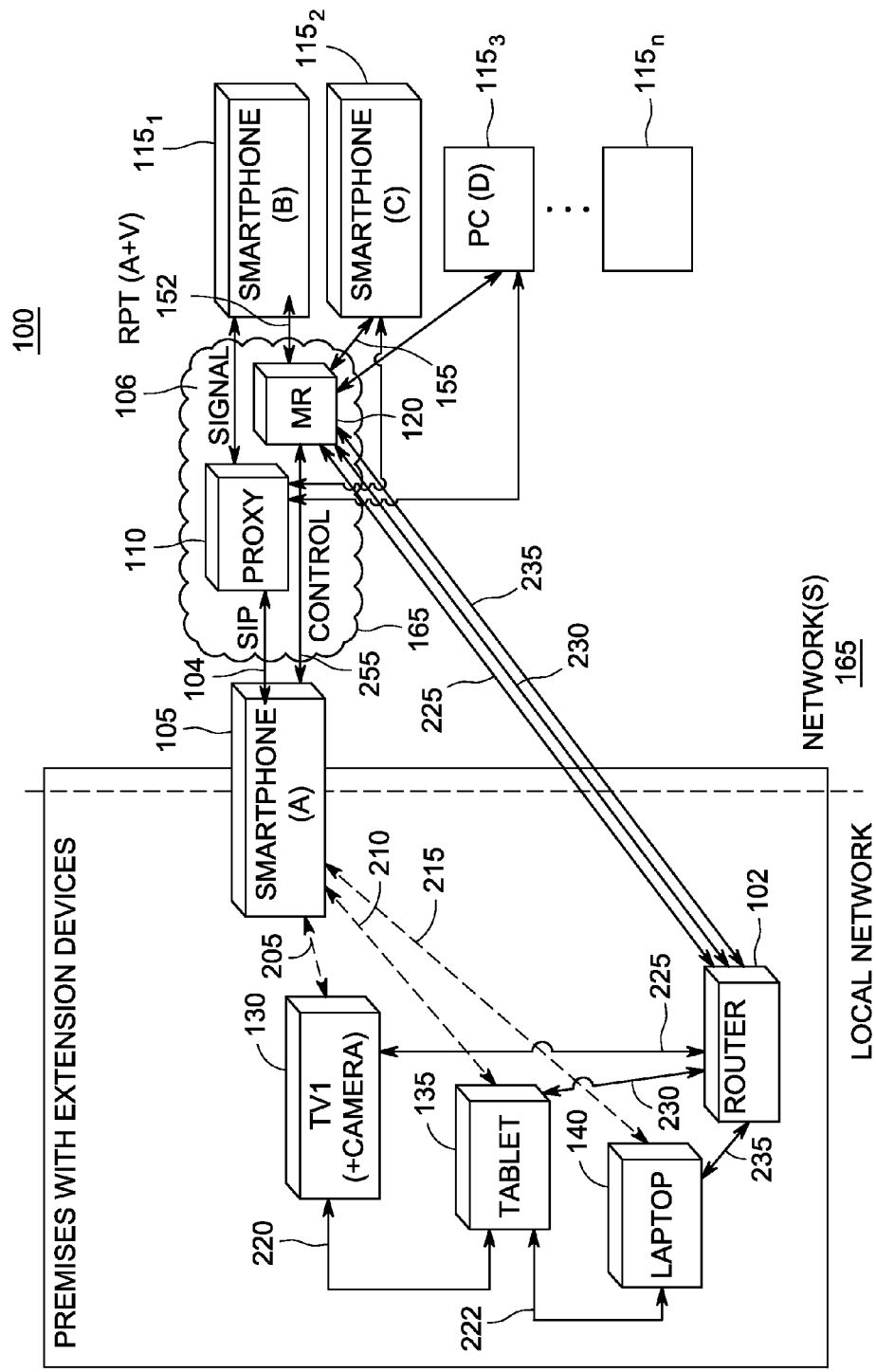
FIG. 2 is a simplified illustration of the communications system of FIG. 1 for parsing streams in accordance with one or more exemplary embodiments of the invention.

FIG. 2 is a simplified illustration of the communications system 100 of FIG. 1 for parsing streams in accordance with one or more exemplary embodiments of the invention. In FIG. 2, the first electronic device 105 has authenticated with the local network 160 using encryption or passkey authentication. The first electronic device then controls streams extended to extension devices (130, 135, 140). The first electronic device 105 authorizes and requests handoffs of parsed streams from the media relay 120 to be communicated to the extension devices (130, 135, 140) via the router 102.

In some embodiments, control signals (arrows 205, 210, and 215) may be directly communicated to the extension devices (e.g. using Bluetooth or NFC). The control signals (205, 210, 215) may also locally control the synchronization of all streams to prevent jitter, echo, perceived latency, and other audio/video synchronization defects.

In alternative embodiments, the synchronization of streams may be controlled by an additional remote control signal (arrow 255) between the first electronic device and the media relay 120. Through instructions and authentication from the first electronic device remote control signal 225, the media relay 120 routes corresponding parsed streams to each extension device (130, 135, 140). The parsed streams (e.g., arrows 225, 230, and 235) are capable of being transmitted at higher bit rates and/or bandwidth to respective extension devices (130, 135, 140) through the network router 102.

In some embodiments, the total bit rate of streams (arrows 225, 230, and 235) may be greater than that of the original single stream 150. The media relay 120 may transfer at greater bit rates to individual extension devices via the parsed streams (arrows 225, 230, and 235) on the local network 160 as opposed to when transferring all streams to the single first electronic device 105 via the original single stream 150. Essentially, the parallel parsed streams (arrows 225, 230, and 235) to extension devices having greater bandwidth than the serially streamed original single stream 150. Similarly, with each extension device processing individual streams, the user perceives video and audio with greater definition and clarity should the extension devices (130, 135, 140) include high-definition televisions (HDTVs), high fidelity sound systems, and the like.

In alternative embodiments, the parsed streams (arrows 225, 230, and 235) to extension devices (130, 135, 140) may be locally synchronized using communications between the extension devices (130, 135, 140). In such embodiments, local synchronization may be through local synchronization control signals (arrows 220 and 222) using timing data for each respective extension device (130, 135, 140). Timing data may be maintained using a local shared clock or sampling and comparison of audio/video streams (arrows 225, 230, 235) to ensure synchronization of streams. Synchronization may be processed by a processor located in the first electronic device or in alternative embodiments in the media relay 120. Alternative embodiments may implement synchronization using algorithms which include audio/video stream time stamps or the use of multiple clocks. Multiple clocks may be integrated within the extension devices (130, 135, 140) or servers in the networks (160, 165).

Figure 3:
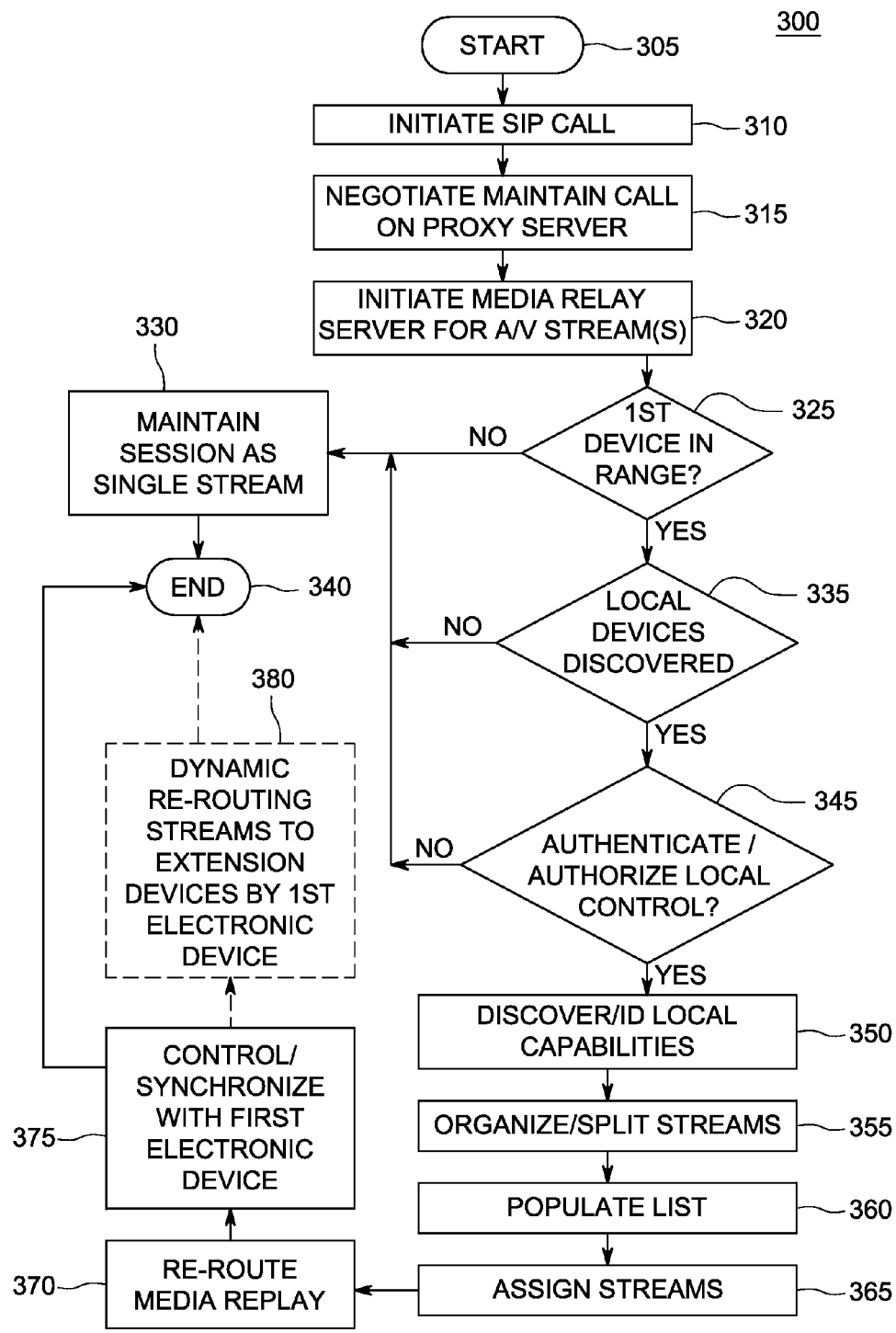
FIG. 3 is a flow diagram of an exemplary method for managing streams in accordance with one or more embodiments of the invention.

FIG. 3 is a flow diagram of an exemplary method 300 for managing streams in accordance with one or more embodiments of the invention. The method 300 may be implemented by the aforementioned system 100. The method 300 begins at step 305 and continues to step 310 wherein a first electronic device 105 initiates a call or communication session using SIP. At step 315, the first electronic device 105 and all other participant devices $115_n$ on the call negotiate the communication session on the proxy server to maintain the communication session. Next at step 320, a media relay server 120 is instructed to process audio and video streams between participant devices $115_n$ of the session. At step 325, the first electronic device determines whether a local wireless network 160 is detected. If the first electronic device 105 is not within range or does not have access to a local wireless network 160 at step 325, the method continues to step 330. At step 330, the communication session is maintained as a single stream to the first electronic device 100 and the method 300 ends at step 340. Similarly, at step 335 when the first electronic device 105 determines there is a local wireless network yet no local extension devices (130, 135, 140) are discovered, the single stream is also maintained at step 335.

Referring back to step 325, if there is local network connectivity and proximate extension devices (130, 135, 140) are on the local network at step 335, the method continues to step 345. At step 345, the first electronic device 105 is authenticated by the local network 160 and authorized to provide local control of extension devices (130, 135, 140). If at step 345, the first electronic device 105 is not authorized, the method 300 continues to step 330 and the system 100 maintains the communication session single stream (arrow 150). However, if the first electronic device 105 is authorized and authenticated at step 345 the method 300 proceeds to step 350. At step 350, the first electronic device 105 discovers and identifies the capabilities of the extension devices (130, 135, 140).

Next, at step 355, the single stream 150 to the first electronic device 105 is separated. In some embodiments the stream is split into streams (i.e. sub-streams) comprising audio and video for the general cumulative input stream to the first electronic device 105 from all participant devices $115_n$. In other embodiments, the stream is separated into multiple streams to reflect audio and video originating from each participant device $115_n$. Originating streams (e.g., arrow 155) may be identified via tags or identifying signals to determine users of particular participant devices $115_n$ or authentication from the proxy server 110 during SIP call setup. In further embodiments wherein multiple users are using the same participant device $115_n$ or multiple audio streams are multiplexed in the same signal stream, individual users may be identified via speech recognition algorithms. In such an embodiment, identification via voice/speech recognition prior to parsing the audio streams by the media relay 120 provides identity verification for selection options at step 360.

At step 360 the method may populate selection options for selecting a particular stream for each extension device (130, 135, 140). In alternative embodiments, selection may be automatically determined by the first electronic device 105 based on known user preferences, previously selected stored preferences, or associated capabilities of each extension device (130, 135, 140).

At step 365, the first electronic device 105 assigns streams to appropriate extension devices (130, 135, 140). In alternative embodiments, the user may manually assign streams via the first electronic device 105 as well as have automatic assignment based on predefined preferences. Next at step 370, the media relay 120 is instructed by the first electronic device 105 to route corresponding streams to the extension devices (130, 135, 140). In some embodiments, the streams are transmitted to and from the extension devices (130, 135, 140) via the network router 102. At step 375, the first electronic device 105 communicates with the proxy server 110 and media relay 120. The first electronic device 105 also maintains an active session to synchronize the streams. Optionally, at step 380, the first electronic device 105 may dynamically route to extension device (130, 135, 140) based on changes to the communication session (e.g. addition or elimination of participant devices $115_n$) on the shared communication session. The method 300 then ends at step 340.

Figure 4:
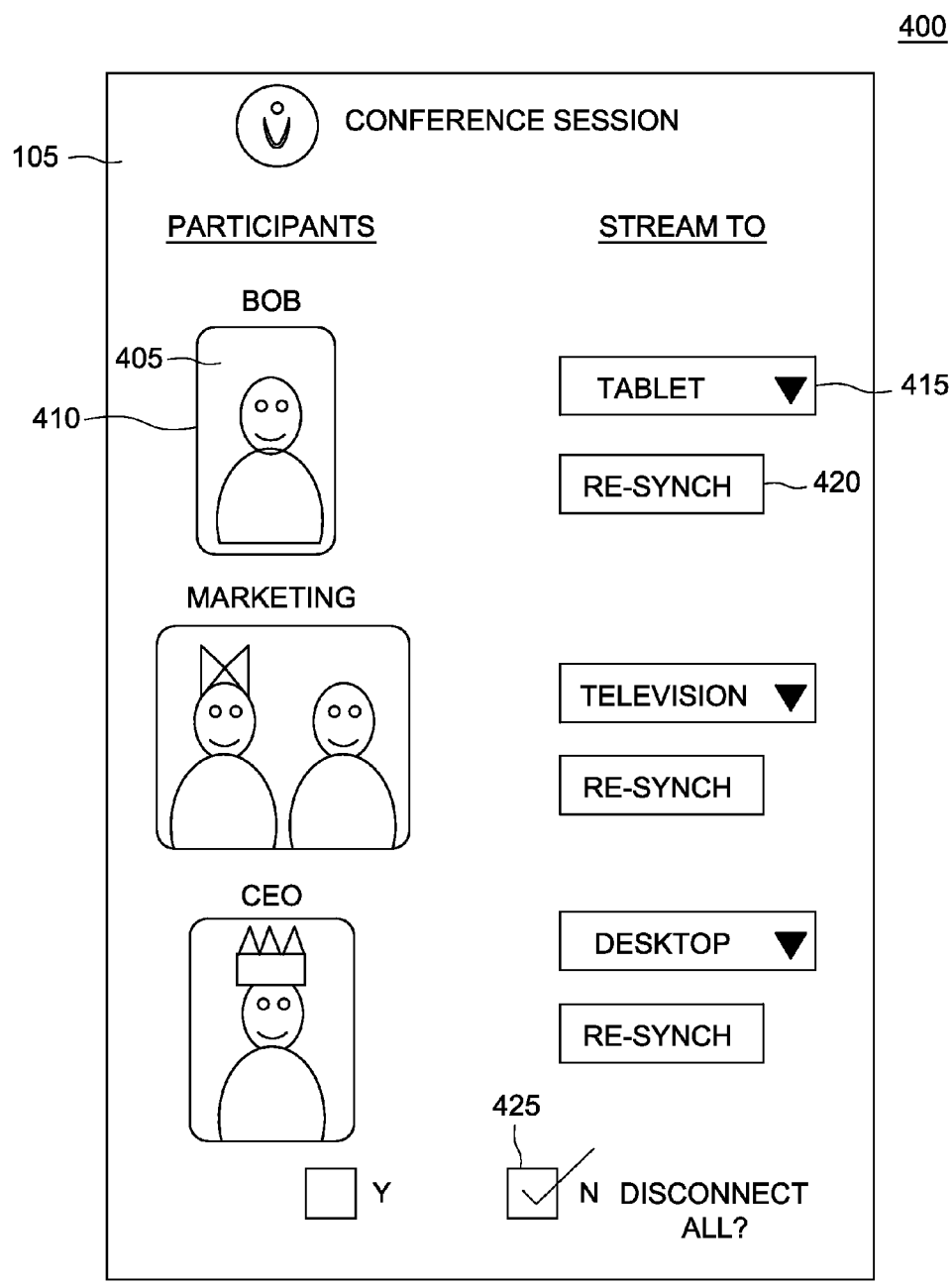
FIG. 4 is an illustration of an exemplary GUI for managing streams on a portable electronic device in accordance with one or more embodiments of the invention.

FIG. 4 is an illustration of an exemplary GUI 400 for managing streams on a portable electronic device 105 in accordance with one or more embodiments of the invention. The exemplary GUI 400 depicts a selection menu wherein the first electronic device 105 has organized streams into respective participant devices $115_n$. In some embodiments, each named participant 405 is displayed as an image in a teleconference or a real-time video 410 in a video conference. The GUI 400 includes an interface such as a drop down menu 415 to select an extension device (130, 135, 140) discovered and authorized via the first electronic device 105. In some embodiments, the GUI 400 may include an interface for manually re-synchronizing a stream such as using a re-synch button 420. Manual resynchronizing may be necessary during changes in network bandwidth availability or the addition/removal of a participant device $115_n$ from the communication session or changes in proximity of the first electronic device 105 to extension devices (130, 135, 140). In additional embodiments, the GUI 400 may include a function to disconnect/disable all streams to the extension devices (130, 135, 140). The function allows the first electronic device 105 to maintain the active communication session while disconnecting extension devices (130, 135, 140). The first electronic device 105 then returns to transceiving the communication as a single stream 150. In this manner, the first electronic device 105 may physically leave the area of the local network 160 without interrupting the communication session.

Additional embodiments may include parsing and routing video and audio streams onto two extension devices for exclusively audio or video. For example, such embodiments may stream audio to a surround sound speaker system and video to a tablet. In such an embodiment, a user of the first electronic device 105 may experience improved audio while viewing the video on the tablet. The tablet may include input communication signals from a camera and microphone for input from the user. Without the input capabilities, the audio and video streams may become one-way streaming output to the respective extension devices.

Figure 5A:
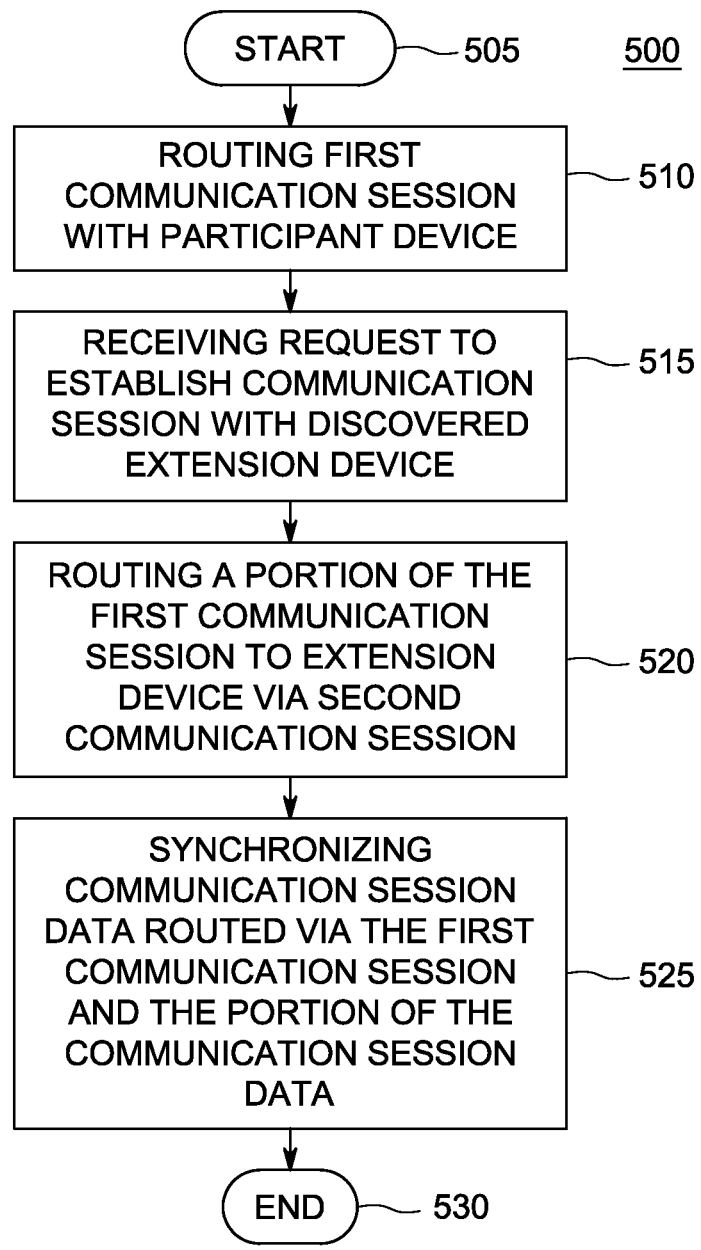
FIGS. 5A and 5B are flow diagrams of an exemplary method for routing active communication session data in accordance with one or more embodiments of the invention.
Figure 5B:
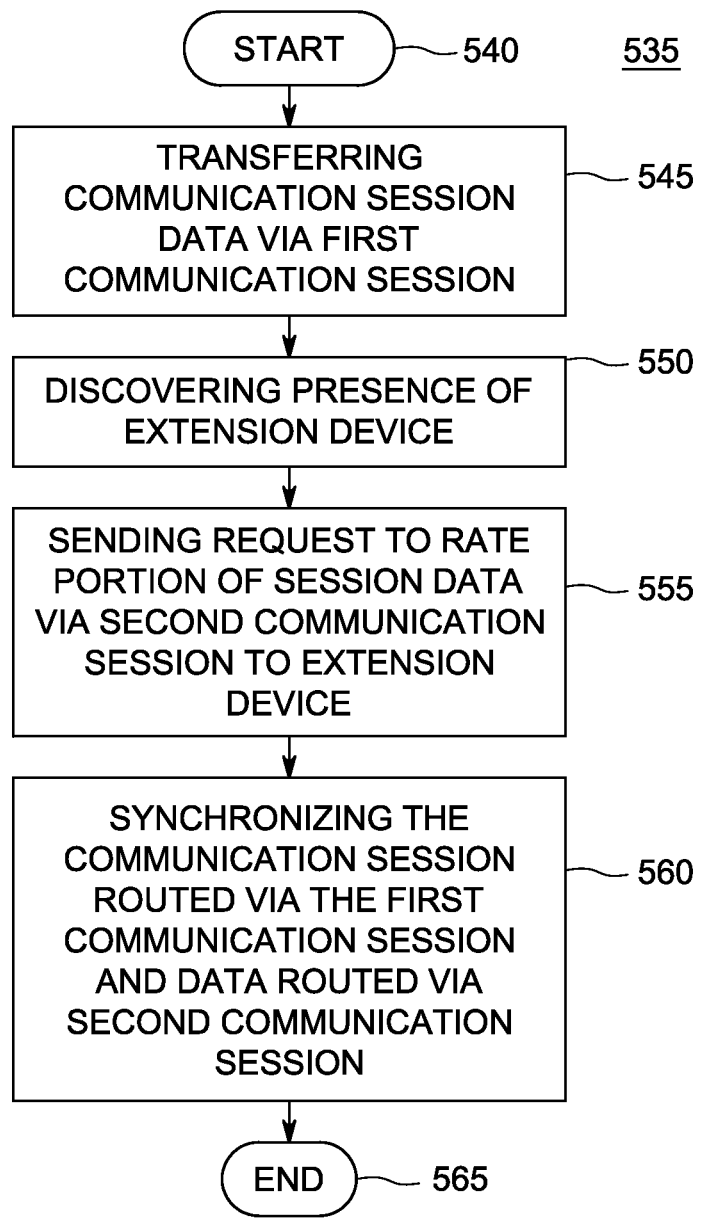

FIGS. 5A and 5B are flow diagrams of an exemplary method for routing active communication session data in accordance with one or more embodiments of the invention. FIG. 5A depicts an exemplary method 500 for routing active communication session data. The method 500 may be implemented by processors located in the first electronic device 105 or in electronic devices such as servers within the networks (160, 165).

The method 500 begins at step 505 and continues to step 510 wherein a first communication session is established and communications are routed between the first electronic device 105 and at least one participant device $115_n$ across the network 165. The first communication session including SIP 104 signals to and from the proxy server 110 and audio/video data stream (arrow 150) to and from the media relay 120. The method 500 continues to step 515 wherein the network 165 receives a request to establish a second communication session across the local network 160 and router 102 from the first electronic device 105. The method 500 continues to step 520 wherein a portion (e.g. arrow 225) of the first communication session is routed to an extension device (e.g. 130) via the second communication session. The method 500 continues to step 525 where the first electronic device 105 synchronizes the communication session data routed via the first communication session (e.g. arrow 150) and the portion of communication session data (e.g. arrow 225). In some embodiments, the synchronization is processed by the first electronic device 105. In some embodiments, the synchronization is processed by the media relay 120. The method 500 then ends at step 530.

FIG. 5B depicts an exemplary method 535 for routing active communication session data. The method 500 may be implemented by processors located in the first electronic device 105 or in electronic devices such as servers within the networks (160, 165).

The method begins at step 540 and continues to step 545. At step 545 communication data is transferred via a first communication session established across the network 165. The communication session data includes SIP data to the proxy server 110 as well as audio and video streaming data from the media relay 120. The method 535 continues to step 550 such that the first electronic device 105 discovers the presence and capabilities (arrows 145, 146, 147) of extension devices (130, 135, 140). Next at step 555, the first electronic device 105 sends a request to the media relay 120 to route a portion of the first communication session data via the second communication session to at least one extension device (e.g. 130). The request may include local network 160 pre-authentication data and data for stream synchronization control (arrow 210). The method 535 continues to step 560 where the first electronic device 105 synchronizes the communication session data routed via the first communication session (e.g. arrow 150) and the portion of communication session data (e.g. arrow 225). In some embodiments, the synchronization is processed by the first electronic device 105. In some embodiments, the synchronization is processed by the media relay 120. The method 535 then ends at step 565.

Figure 6:
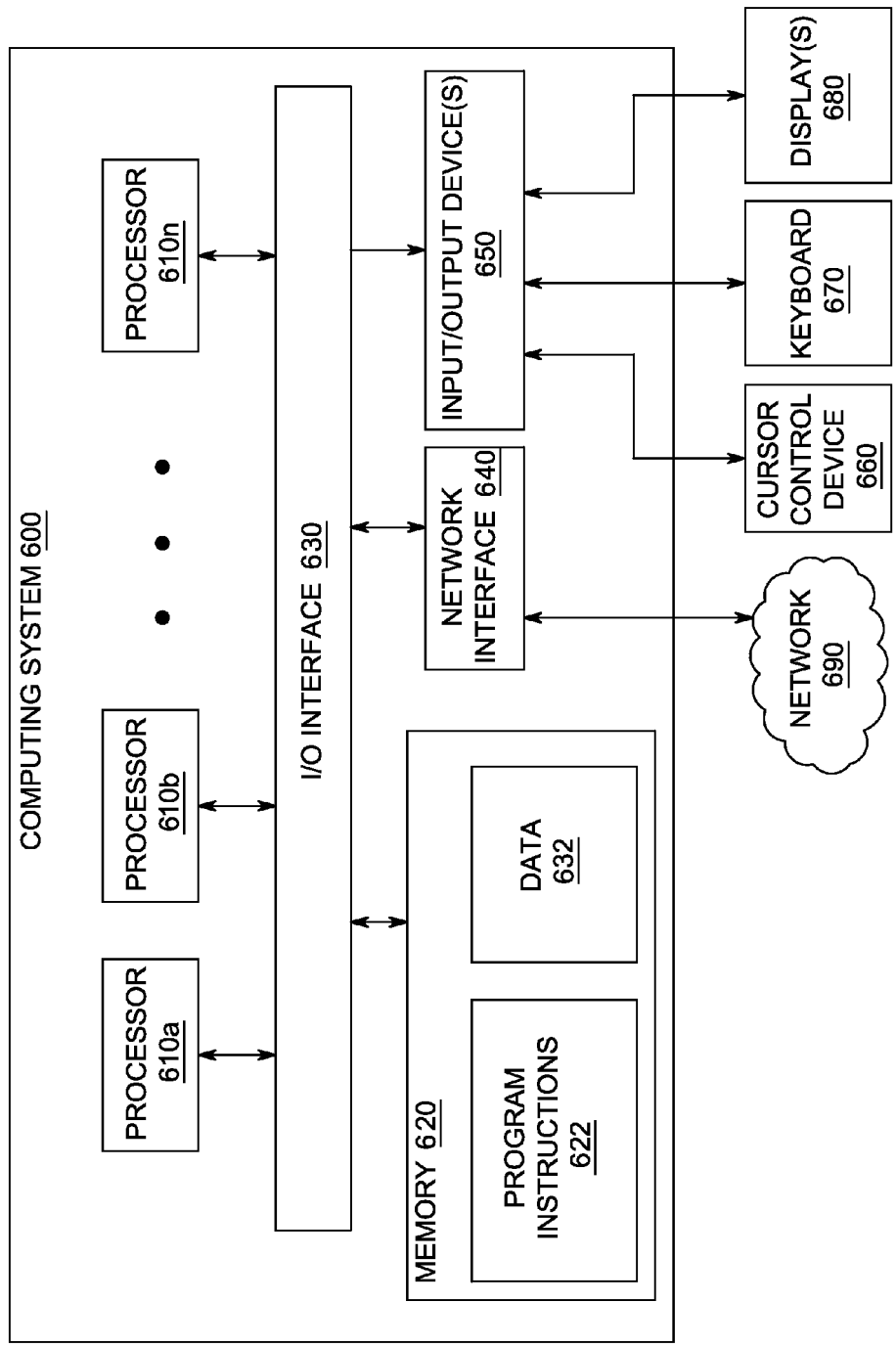
FIG. 6 is a depiction of a computer system that can be utilized in various embodiments of the present invention.

FIG. 6 is a depiction of a computer system 600 that can be utilized in various embodiments of the present invention. The computer system 600 comprises substantially similar structure comprising servers or electronic devices in the aforementioned embodiments.

Various embodiments of methods and system for routing active communication session data, as described herein, may be executed on one or more computer systems, which may interact with various other devices. One such computer system is computer system 600 illustrated by FIG. 6, which may in various embodiments implement any of the elements or functionality illustrated in FIGS. 1-5B. In various embodiments, computer system 600 may be configured to implement methods described above. The computer system 600 may be used to implement any other system, device, element, functionality or method of the above-described embodiments. In the illustrated embodiments, computer system 600 may be configured to implement methods 300, 500, and 535 as processor-executable executable program instructions 622 (e.g., program instructions executable by processor(s) 610) in various embodiments.

In the illustrated embodiment, computer system 600 includes one or more processors 610a-610n coupled to a system memory 620 via an input/output (I/O) interface 630. Computer system 600 further includes a network interface 640 coupled to I/O interface 630, and one or more input/output devices 660, such as cursor control device 660, keyboard 670, and display(s) 680. In some embodiments, the keyboard 670 may be a touchscreen input device.

In various embodiments, any of the components may be utilized by the system to route active communication session data described above. In various embodiments, a user interface may be generated and displayed on display 680. In some cases, it is contemplated that embodiments may be implemented using a single instance of computer system 600, while in other embodiments multiple such systems, or multiple nodes making up computer system 600, may be configured to host different portions or instances of various embodiments. For example, in one embodiment some elements may be implemented via one or more nodes of computer system 600 that are distinct from those nodes implementing other elements. In another example, multiple nodes may implement computer system 600 in a distributed manner.

In different embodiments, computer system 600 may be any of various types of devices, including, but not limited to, personal computer systems, mainframe computer systems, handheld computers, workstations, network computers, application servers, storage devices, a peripheral devices such as a switch, modem, router, or in general any type of computing or electronic device.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs). In multiprocessor systems, each of processors 610 may commonly, but not necessarily, implement the same ISA.

System memory 620 may be configured to store program instructions 622 and/or data 632 accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 620. In other embodiments, program instructions and/or data may be received, sent or stored upon different types of computer-accessible media or on similar media separate from system memory 620 or computer system 600.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network (e.g., network 690), such as one or more external systems or between nodes of computer system 600. In various embodiments, network 690 may include one or more networks including but not limited to Local Area Networks (LANs) (e.g., an Ethernet or corporate network), Wide Area Networks (WANs) (e.g., the Internet), wireless data networks, cellular networks, Wi-Fi, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, touchscreens, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In some embodiments, the illustrated computer system may implement any of the methods described above, such as the methods illustrated by the flowchart of FIGS. 3, 5A, and 5B. In other embodiments, different elements and data may be included.

Those skilled in the art will appreciate that computer system 600 is merely illustrative and is not intended to limit the scope of embodiments. In particular, the computer system and devices may include any combination of hardware or software that can perform the indicated functions of various embodiments, including computers, network devices, Internet appliances, smartphones, tablets, PDAs, wireless phones, pagers, and the like. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A method for routing active communication session data comprising:
    routing communication session data between a first device and at least one participant device via a first communication session;
    receiving a request to establish a second communication session with at least one discovered extension device proximate to the first device;
    routing at least a portion of the communication session data to the discovered extension device via the second communication session; and
    synchronizing the communication session data routed via the first communication session, and the at least a portion of the communication session data routed via the second communication session.

2. The method of claim 1, wherein the communication session data is video teleconference data and includes at least one video stream and at least one audio stream.

3. The method of claim 2, wherein the portion of the communication session data routed to the discovered extension device via the second communication session is one of the at least one video streams.

4. The method of claim 3, wherein the portion of the communication session data routed to the discovered extension device via the second communication session is one of the at least one audio streams.

5. The method of claim 2, wherein the portion of the communication session data routed to the discovered extension device via the second communication session is at least one video stream and audio stream corresponding one participant device of a plurality of participant devices.

6. The method of claim 2, wherein synchronizing the communication session data further comprises comparing time stamps of the at least one video and at least one audio stream, or the sampling of multiple clocks.

7. The method of claim 1, wherein the first communication session is established on a first network and the at least one extension device is discovered on a second network different from the first network.

8. The method of claim 7, wherein the first network further comprises a media relay server capable of routing the portion of communication session data to the extension devices via the first and second networks.

9. The method of claim 1, wherein the at least one extension device is discovered using the universal plug and play (UPNP) protocol, and the at least one extension device is capable of transmitting or receiving internet protocol (IP) telephony conference call sessions.

10. The method of claim 1 wherein the first device is a portable device and at least one of: a cellular telephone, tablet, laptop, or wireless phone.

11. A method for transferring active communication session data comprising:
    transferring communication session data between a first device and at least one participant device via a first communication session;

discovering a presence of at least one extension device proximate to the first device;

sending a request to have at least a portion of the communication session data routed to one of the at least one discovered extension device via a second communication session; and synchronizing the communication session data routed via the first communication session, and the at least a portion of the communication session data routed via the second communication session.

12. The method of claim 11, wherein the communication session data is video teleconference data and includes at least one video stream and at least one audio stream.

13. The method of claim 12, wherein the portion of the communication session data routed to the discovered extension device via the second communication session is one of the at least one video streams.

14. The method of claim 12, wherein the portion of the communication session data routed to the discovered extension device via the second communication session is one of the at least one audio streams.

15. The method of claim 11, wherein the portion of the communication session data routed to the discovered extension device via the second communication session is at least one video stream and audio stream corresponding to at least one participant device of a plurality of participant devices.

16. The method of claim 11, wherein synchronizing the communication session data further comprises comparing time stamps of the at least one video and at least one audio stream, or the sampling of multiple clocks.

17. The method of claim 11, wherein the first communication session is established on a first network and the at least one extension device is discovered on a second network different from the first network.

18. The method of claim 17, wherein the first network further comprises a media relay server capable of routing the portion of communication session data to the extension devices via the first and second networks.

19. The method of claim 11, wherein the presence of at least one extension device is discovered by the first device using the universal plug and play (UPNP) protocol, the at least one extension device capable of transmitting or receiving internet protocol (IP) telephony conference call sessions.

20. The method of claim 11, wherein the first device is a portable device and at least one of: a cellular telephone, tablet, laptop, or wireless phone.

21. A system for transferring active communication session data comprising:
 a) at least one processor;
 b) at least one input device coupled to at least one network; and
 c) at least one storage device storing processor executable instructions which, when executed by the at least one processor, performs a method including:
 (1) routing communication session data between a first device and at least one participant device via a first communication session;
 (2) receiving a request to establish a second communication session with at least one discovered extension device proximate the first device;
 (3) routing at least a portion of the communication session data to the discovered extension device via the second communication session; and
 (4) synchronizing the communication session data routed via the first communication session, and the at least a portion of the communication session data routed via the second communication session.

* * * * *